Jan. 29, 1957     H. C. DOANE     2,779,164

REFRIGERATING APPARATUS FOR AN AUTOMOBILE

Filed Oct. 15, 1953     3 Sheets-Sheet 1

INVENTOR.
Harry C. Doane.
BY R. R. Candor.

His Attorney.

Jan. 29, 1957  H. C. DOANE  2,779,164
REFRIGERATING APPARATUS FOR AN AUTOMOBILE
Filed Oct. 15, 1953  3 Sheets-Sheet 2

INVENTOR.
Harry C. Doane.
BY R. R. Candor.
His Attorney.

Jan. 29, 1957   H. C. DOANE   2,779,164
REFRIGERATING APPARATUS FOR AN AUTOMOBILE
Filed Oct. 15, 1953   3 Sheets-Sheet 3

INVENTOR.
Harry C. Doane.
BY
R. R. Candor.
His Attorney.

United States Patent Office 2,779,164
Patented Jan. 29, 1957

2,779,164
REFRIGERATING APPARATUS FOR AN AUTOMOBILE

Harry C. Doane, Lake Fenton, Mich., assignor to General Motors Corporation, Detroit, Mich., a corporation of Delaware Application October 15, 1953, Serial No. 386,300

8 Claims. (Cl. 62—6)

This invention relates to refrigerating apparatus and more particularly to an automobile air conditioning system.

One object of this invention is to provide an automobile air conditioning system wherein a controlled amount of fresh air is admitted to the passenger compartment.

Another object of this invention is to provide an automobile air conditioning system which may be used to provide controlled ventilation for a passenger car at such times when no refrigeration is required.

Further objects and advantages of the present invention will be apparent from the following description, reference being had to the accompanying drawings, wherein a preferred form the the present invention is clearly shown.

Figure 1:
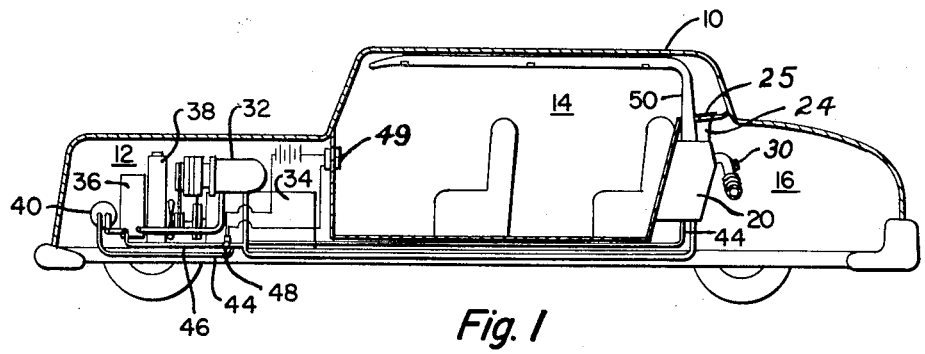
Figure 1 is a vertical sectional view largely schematic showing my invention applied to a passenger automobile.
Figure 2:
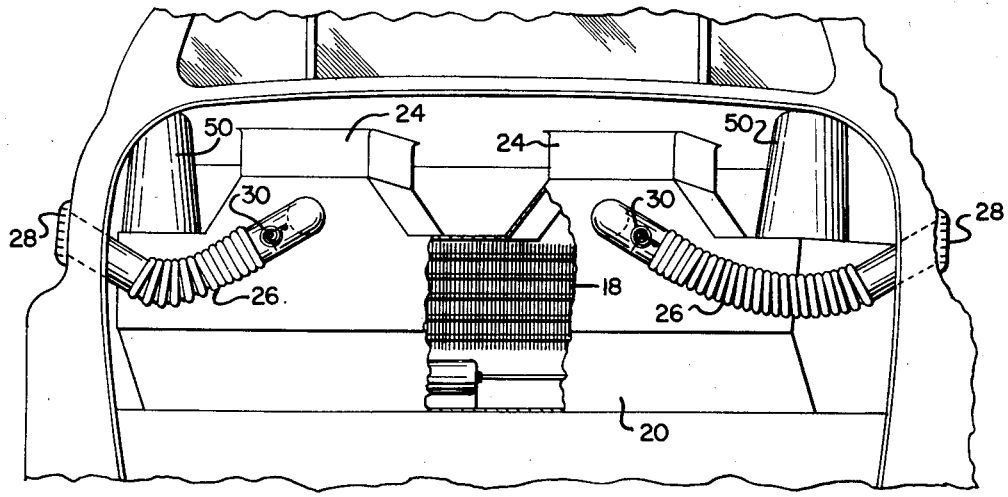
Figure 2 is a fragmentary perspective view with parts broken away showing the arrangement of the equipment in the luggage compartment of a modern car.

For purposes of illustrating the invention, it has been shown applied to a passenger automobile wherein the evaporator and blower assembly is mounted in the luggage compartment of a car whereas certain aspects of the invention are equally applicable to air conditioning systems wherein the evaporator may be located at some other place such as beneath the instrument panel or under the front seat. Referring now to the drawings, reference numeral 10 designates a conventional passenger automobile having an engine compartment 12, a passenger compartment 14 and a luggage compartment 16. A conventional engine driven refrigerating system having an evaporator 18 located directly behind the rear seat has been shown. The evaporator 18 is mounted in a housing 20 located in the luggage compartment 16 and serves to cool air for the passenger compartment when the temperature within the passenger compartment exceeds a predetermined value. Both recirculated air and a controlled quantity of fresh air can be cooled by the evaporator.

The recirculated air to be cooled enters the evaporator housing 20 through a pair of return air ducts 24 which serve to withdraw air from the passenger compartment through return air grilles 25 located in the package shelf directly behind the back seat. Fresh air ducts 26 are provided for introducing fresh air from the side air scoops 28 into the return air ducts 24 as shown. Thermostatically operated dampers generally designated by the reference numeral 30 are provided for controlling the flow of fresh air through the fresh air ducts in a manner to be explained more fully hereinafter.

The refrigerant liquefying apparatus which supplies liquid refrigerant to the evaporator 18 comprises a compressor 32 mounted in the engine compartment of the car. This compressor is directly driven from the main car engine 34. The compressed refrigerant is discharged from the compressor 32 into a condenser 36 which is located in front of the main engine radiator 38. The condenser refrigerant is then supplied to a receiver 40 from whence liquid refrigerant is supplied to the evaporator 18 through a conduit 44.

Any suitable type of controls may be provided for regulating the amount of refrigeration produced. For purposes of illustrating the invention there is shown an arrangement in which a by-pass 46 is provided for connecting the outlet of the condenser 36 to the suction line of the compressor 32 when the temperature in the car drops so as to by-pass refrigerant from the outlet of the condenser to the inlet of the compressor without passing through the evaporator. A thermostatically controlled restrictor valve 48 is provided in the by-pass line and serves to allow a limited amount of the refrigerant to flow through the by-pass when the valve is open so as to reduce the effective compressor capacity without stopping the circulation of refrigerant and lubricant through the compressor. In order to simplify this disclosure a thermostat 49 which responds to the air temperature in the passenger compartment has been shown for controlling the solenoid valve 48.

During hot weather in particular, it is desirable to keep the windows closed and to admit fresh air into the passenger compartment through the fresh air ducts 26 which direct the incoming fresh air onto the chamber or housing 20 for the evaporator 18 where the air is cooled before the air is discharged into the passenger compartment through the conventional air distributing ducts 50.

Figure 3:
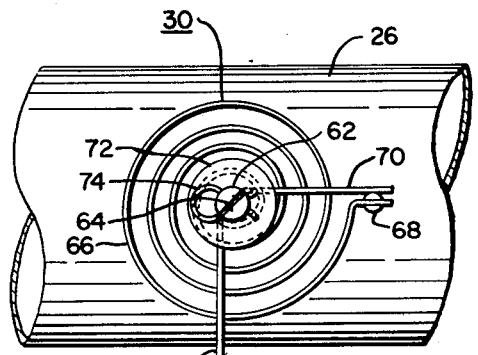
Figure 3 is a fragmentary elevational view showing a bimetallic thermostat for use in controlling the admission of fresh air.
Figure 4:
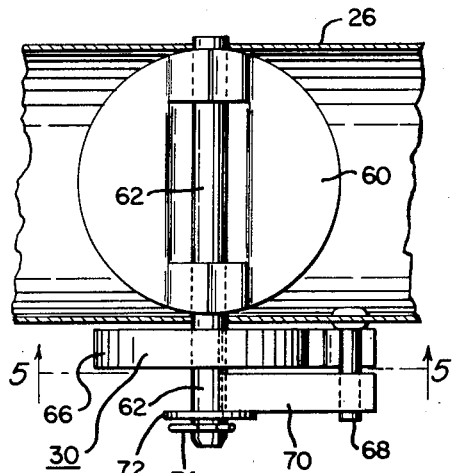
Figure 4 is a fragmentary sectional view showing the relationship between the fresh air damper and the thermostatic operator therefor.
Figure 5:
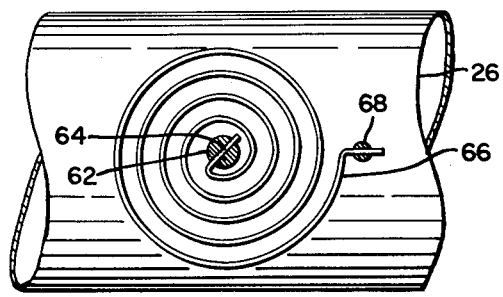
Figure 5 is a sectional view taken substantially on line 5—5 of Figure 4.

During cold weather when no refrigeration is required there may be times when the temperature of the outside air is too low to be used in large quantities for ventilating purposes and for that reason a modulating type of thermostatic control damper 30 has been provided in each of the fresh air ducts for regulating the quantity of fresh air admitted. As best shown in Figures 3 through 5 each control damper includes an element 60 which is keyed to rotate with the damper operating shaft 62. The shaft 62 is long enough to project through opposite sides of the fresh air duct 26 as shown in Figure 4 so as to be journaled directly in the walls of the duct 26. The one end of the shaft is slotted as shown at 64 throughout the entire projecting portion of the shaft for a purpose to be explained hereinafter.

A spirally shaped bimetallic element 66 has its inner end arranged to project through the slot 64 in the shaft 62 and has the other end anchored to a stationary pin 68 carried by one wall of the duct 26. This thermostatic element is so designed that as the air temperature decreases, the damper moves toward the closed position. By virtue of this arrangement it is obvious that at all higher outdoor air temperatures the damper will be in the fully open position and will only begin to close as the outside air temperature decreases.

The extent of movement of the damper in either direction is limited by a spring element 70 which has its mid-portion passing through the slot 64 in the shaft 62 and has its ends arranged at right angles to one another so as to abut against the pin 68 when the damper reaches either the fully open position or the fully closed position. A washer 72 which is held in place by a spring clip 74 holds the stop element 70 and the thermostatic element 66 in place within the slot 64 in the shaft. By virtue of the fact that the thermostatic element 66 is mounted in the trunk compartment of a car it is protected from the direct rays of the sun and will respond to the temperature of the air in the trunk compartment of the car. This temperature will reflect very closely the actual outdoor air temperature.

Figure 6:
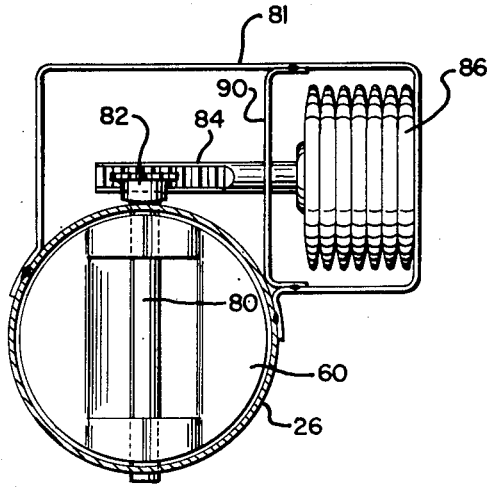
Figure 6 is a fragmentary sectional view showing a modified type of damper operating motor.
Figure 7:
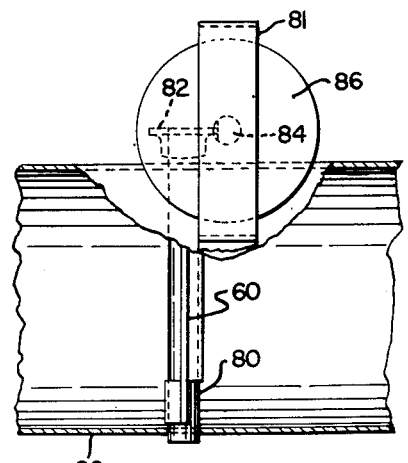
Figure 7 is an elevational vertical mechanism shown in Figure 6 with parts broken away and taken substantially at right angles to Figure 6.

In Figures 6 and 7 of the drawing there is shown a modified type of damper actuator. In this latter type of damper actuator the damper element 60 located in the fresh air duct 26 is keyed to a shaft 80 which has a pinion 82 secured to its one projecting end. This pinion is adapted to be operated by a rack 84 which in turn is actuated in response to contraction and expansion of the bellows 86 to which the one end of the rack 84 is attached. The bellows 86 has its one end fixed to a sheet metal bracket 81. This bracket in turn has its ends spot welded or otherwise secured to the walls of the duct 26 as shown in Figure 6. The bellows 86 contain a low boiling point liquid which serves to cause expansion and contraction of the bellows at predetermined temperatures in accordance with well known practice. The rack 84 is adapted to be guided by means of a cross-arm 90 secured to the bracket 81. By virtue of the above described construction and arrangement it is obvious that a very inexpensive yet troublefree control has been provided which automatically serves to shut off the flow of outside air as the outside air temperature becomes too cold for comfort.

Figure 8:
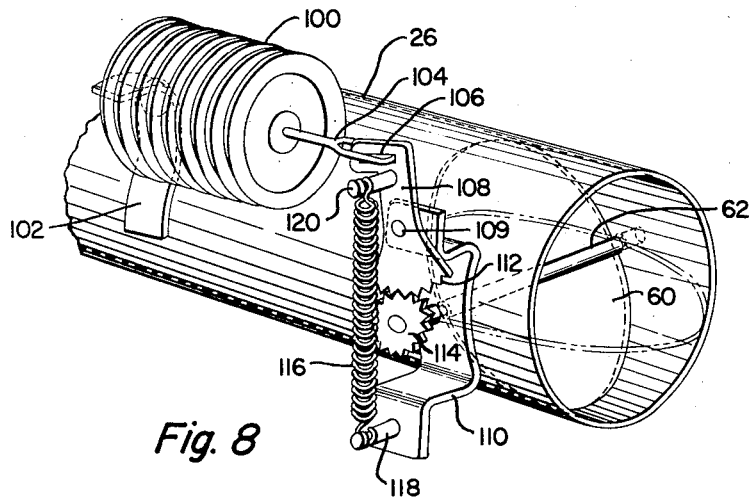
Figures 8 and 9 are perspective and elevational views respectively of a modified damper operating arrangement.

In Figure 8 there is shown still another modification of a valve or damper for controlling the admission of fresh air. In this modification the thermostatic element which actuates the damper 60 comprises a charged bellows 100 which has its one end anchored to the side wall of the air duct 26 by means of a bracket 102 and which carries a projecting slotted rod 104 at its free end. The rod 104 is arranged to be engaged within a slot 106 provided in the upper end of a lever 108 pivotally secured to a bracket 110 which in turn is secured to the fresh air duct 26 as shown. The lower end of the lever 108 is provided with gear teeth 112 which mesh with the gear teeth on a pinion 114 secured to the end of the damper supporting shaft 62.

In order to obtain snap action of the damper and in order to hold the damper in either the fully open position or the fully closed position a tension spring 116 has been provided which has its one end secured to a fixed pin 118 carried by the bracket 110 and which has its other end secured to a pin 120 fixed to the lever 108 above the pivot pin 109 which supports the lever 108. By virtue of the above described arrangement an over-center toggle has been provided for producing snap action of the valve.

Figure 9:
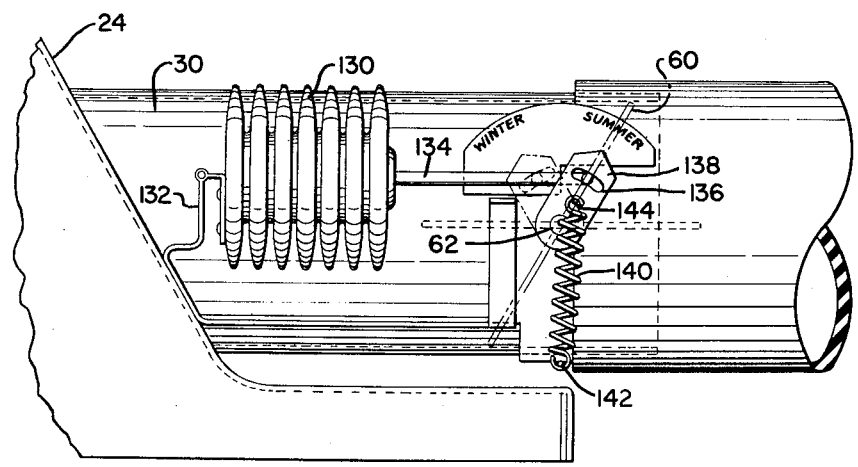

Figure 9 of the drawing shows still another modification of a snap acting valve operating mechanism which may be used for controlling the admission of fresh air. In this modification an expansible bellows 130 has its end held stationary by means of a supporting bracket 132 and carries a lever 134 at its free end which projects into a slot 136 in the damper operating lever 138. The lever 138 is keyed to the damper operating shaft 62. In this modification the over-center spring 140 has its one end 142 fixed to the side wall of the air duct and has its other end hooked over a pin 144 fastened to the lever 138. Expansion and contraction of the bellows 130 then serves to actuate the lever 138 and the spring 140 serves to produce a snap action with the result that the valve element 60 moves from its open position to the closed position with a snap action.

While the form of embodiment of the invention as herein disclosed constitutes a preferred form, it is to be understood that other forms might be adopted, as may come within the scope of the claims which follow.

What is claimed is as follows:

1. In an air conditioning system for installation in an automobile having a passenger compartment and a luggage compartment, the combination, a conditioning chamber adapted to be mounted in said luggage compartment for supplying conditioned air to the passenger compartment of the automobile, means for passing a stream of fresh air to said chamber, means for passing a stream of return air from said passenger compartment to said chamber, means for mixing the streams of fresh and return air passing to said chamber, air conditioning means in said chamber for varying the temperature of said mixture, damper means for controlling the supply of fresh air, and damper motor means responsive to the temperature of the air in said luggage compartment for causing said damper means to move toward closed position in response to a predetermined change in the air temperature within said luggage compartment.

2. In an automobile air conditioning system, the combination, a conditioning chamber for supplying conditioned air to the passenger compartment of the automobile, means for passing a stream of fresh air to said chamber, means for passing a stream of return air from said passenger compartment to said chamber, means for mixing the streams of fresh and return air passing to said chamber, air conditioning means in said chamber for varying the temperature of said mixture, damper means for controlling the supply of fresh air, and damper motor means responsive to the temperature of the air outside said compartment for causing said damper means to move toward closed position in response to a predetermined change in the outside air temperature, and thermostatic means for controlling the rate at which said air conditioning means varies the temperature of said mixture.

3. In combination with an automobile having an engine compartment, a passenger compartment, and a luggage compartment; a refrigerating system including an evaporator for cooling air, a housing for said evaporator, means for conveying air from said passenger compartment to said housing, means for conveying outside air to said housing, damper means in said last named means, and a thermostat within said luggage compartment for controlling said damper means.

4. In combination with an automobile having an engine compartment, a passenger compartment, and a luggage compartment; a refrigerating system including an evaporator for cooling air, a housing for said evaporator, means for conveying air from said passenger compartment to said housing, means for conveying outside air to said housing, damper means in said last named means, a thermostat within said luggage compartment for controlling said damper means, and means responsive to the temperature of the air within said passenger compartment for controlling the operation of said refrigerating system.

5. In an automobile air conditioning system for use in a car having a passenger compartment and a luggage compartment, a conditioning chamber for supplying conditioned air to the passenger compartment, means for passing a stream of fresh air through the rear wall of said chamber, air conditioning means in said chamber for varying the temperature of said fresh air, means for discharging said air upwardly from said chamber into the passenger compartment, damper means for controlling the supply of fresh air, and thermostat means responsive to the temperature in said luggage compartment for controlling the operation of said damper means.

6. In combination with an automobile having an engine compartment, a passenger compartment, and a luggage compartment; a refrigerating system including an evaporator for cooling air, a housing for said evaporator, means for conveying air from said passenger compartment to said housing, means for conveying outside air to said housing, damper means in said last named means, and a thermostat within said luggage compartment for controlling said damper means, said thermostat comprising a temperature responsive element and an over-center toggle device operated thereby for causing said damper means to be actuated with a snap action.

7. In combination with an automobile having an engine compartment, a passenger compartment, and a luggage compartment; a refrigerating system including an evaporator for cooling air, a housing for said evaporator, means for conveying air from said passenger compartment to said housing, means for conveying outside air to said housing, damper means in said last named means, a thermostat arranged to reflect changes in outside air temperatures for controlling said damper means, and power transmitting means for transmitting power from said thermostat to said damper means, said power transmitting means comprising a mechanism for actuating said damper means with a snap action and for selectively holding the damper means in its fully open or its fully closed position.

8. In combination with an automobile having an engine compartment and a passenger compartment; a refrigerating system including an evaporator for cooling air for said passenger compartment, a housing for said evaporator, means for conveying air from said passenger compartment to said housing, a duct for conveying outside air to said housing, damper means in said duct and having an operating shaft projecting through the wall of said duct, and actuating mechanism for controlling said damper means; said actuating mechanism comprising a temperature responsive element and an over-center toggle device operated thereby for causing said damper means to be actuated with a snap-action; said toggle device comprising a lever element secured to said shaft, an over-center spring having one end fixed relative to said duct and having its other end attached to said lever for biasing said lever selectively to damper opening and damper closing positions, and a lost motion connection between said temperature responsive element and said lever.

References Cited in the file of this patent

UNITED STATES PATENTS

| | | |
|---|---|---|
| 322,491 | Smith | July 21, 1885 |
| 1,952,362 | Bulger | Mar. 27, 1934 |
| 2,017,579 | Anderson | Oct. 15, 1935 |
| 2,053,206 | Sargent | Sept. 1, 1936 |
| 2,071,801 | Rust | Feb. 23, 1937 |
| 2,115,472 | Sargent | Apr. 26, 1938 |
| 2,180,760 | Mayo | Nov. 21, 1939 |
| 2,187,982 | Moncrief | Jan. 23, 1940 |
| 2,262,948 | Long | Nov. 18, 1941 |
| 2,286,961 | Hanson | June 16, 1942 |
| 2,364,144 | Hunsaker | Dec. 5, 1944 |
| 2,714,808 | Owen | Aug. 9, 1955 |